United States Patent
Jeon et al.

(10) Patent No.: US 8,773,371 B2
(45) Date of Patent: Jul. 8, 2014

(54) FLAT PANEL DISPLAY WITH A TOUCH SCREEN PANEL

(75) Inventors: Hee-Chul Jeon, Yongin (KR); Ji-Eun Kim, Yongin (KR); Sung-Joo Hwang, Yongin (KR); Se-Il Cho, Yongin (KR); Won-Mi Hwang, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 682 days.

(21) Appl. No.: 12/882,528

(22) Filed: Sep. 15, 2010

(65) Prior Publication Data

US 2011/0227838 A1 Sep. 22, 2011

(30) Foreign Application Priority Data

Mar. 16, 2010 (KR) .................. 10-2010-0023241

(51) Int. Cl.
*G06F 3/041* (2006.01)
*G09G 5/10* (2006.01)

(52) U.S. Cl.
USPC .......................................... 345/173; 345/690

(58) Field of Classification Search
USPC .................. 345/173, 178, 211, 212, 174
See application file for complete search history.

(56) References Cited

U.S. PATENT DOCUMENTS

| | | | |
|---|---|---|---|
| 5,648,642 A | 7/1997 | Miller et al. | |
| 8,289,296 B2 | 10/2012 | Jeong et al. | |
| 8,368,661 B2 | 2/2013 | Chang et al. | |
| 2008/0264699 A1* | 10/2008 | Chang et al. | 178/18.01 |
| 2008/0309635 A1* | 12/2008 | Matsuo | 345/173 |
| 2010/0149116 A1* | 6/2010 | Yang et al. | 345/173 |
| 2010/0309160 A1 | 12/2010 | Lin | |
| 2011/0090154 A1 | 4/2011 | Kuo | |

FOREIGN PATENT DOCUMENTS

| | | |
|---|---|---|
| JP | 2006-011522 | 1/2006 |
| JP | 3134925 U | 8/2007 |
| JP | 2008-310550 | 12/2008 |
| JP | 2009-123106 | 6/2009 |
| JP | 2010-044453 | 2/2010 |
| KR | 10-2004-0017139 A | 2/2004 |
| KR | 10-2008-0096352 A | 10/2008 |
| KR | 10-2009-0111783 | 10/2009 |
| KR | 10-2010-0010019 | 1/2010 |
| KR | 10-2010-0061993 | 6/2010 |
| KR | 10-2010-0084263 | 7/2010 |
| KR | 10-2011-0022269 | 3/2011 |

OTHER PUBLICATIONS

KIPO Office action dated May 24, 2011, for Korean Patent application 10-2010-0023239, 1 page.

(Continued)

*Primary Examiner* — Michael Faragalla
(74) *Attorney, Agent, or Firm* — Christie, Parker & Hale, LLP

(57) ABSTRACT

A flat panel display integrated with a touch screen panel. The connecting patterns, which connect adjacent first sensing cells and adjacent second sensing cells are formed on the same level of the lower surface of the upper substrate of the flat panel display of the same material as metal patterns formed around the edge of the touch screen panel, and by arranging the connecting patterns not to cross each other. The flat panel display panel can also be integrated with a touch screen having improved visibility by forming the touch screen panel on the upper substrate of the flat panel display such that connecting patterns are formed in the regions between the pixels.

11 Claims, 4 Drawing Sheets

(56) References Cited

OTHER PUBLICATIONS

KIPO Office action dated Oct. 27, 2011, for Korean priority Patent application 10-2010-0023241, 1 page.
Japanese Decision of Grant dated Nov. 13, 2012, for Japanese Patent application 2010-153852, (3 pages).
Japanese Office action dated Mar. 6, 2012, for Japanese Patent application 2010-153852, (2 pages).
U.S. Office action dated May 23, 2013, for cross reference U.S. Appl. No. 12/898,005, (16 pages).
U.S. Office action dated Jan. 21, 2014, for cross reference U.S. Appl. No. 12/898,005, (17 pages).
English translation of KIPO Decision to Grant dated Oct. 27, 2011, for corresponding Korean Patent application 10-2010-0023241 (2 pages).

* cited by examiner

FLAT PANEL DISPLAY WITH A TOUCH SCREEN PANEL

CROSS-REFERENCE TO RELATED APPLICATION

This application claims the benefit of Korean Application No. 10-2010-0023241, filed Mar. 16, 2010 in the Korean Intellectual Property Office, the disclosure of which is incorporated herein by reference.

BACKGROUND OF THE INVENTION

1. Field of the Invention

Aspects of the present invention relate to a touch screen panel, particularly a touch screen panel integrally formed with the upper substrate of a flat panel display 2. Description of the Related Art A touch screen panel is an input device that selects contents displayed on a screen such as an image display device, etc. using a person's hand or an object to input commands of a user.

To this end, a touch screen panel is provided on the front face of the image display device and converts positions directly contacted by a person's hand or an object into electrical signals. Therefore, the command contents selected at the contact position are received as the input signals. As the touch screen panel can replace a separate input device that is operated by being connected with the image display device such as a keyboard or a mouse, the fields of use for touch screen panels are being expanded gradually.

For implementing the contact for a touch screen panel, a resistive type, a light sensing type, and a capacitive type, etc., have been known.

Among those, when the person's hand or the object contacts the touch screen panel in the capacitive type, the conductive sensing pattern senses the change in capacitance by other adjacent sensing patterns or ground electrodes, etc., thereby converting the contacting position into the electrical signals.

In order to clearly determine the contacting position at the contacting surface, the sensing pattern is configured to include first sensing patterns (X patterns) formed to be connected along a first direction and second sensing patterns (Y patterns) formed to be connected along a second direction.

In the related art, the first and second sensing patterns each are disposed on different layers. In other words, as one example, the first sensing patterns are disposed on the lower layer, the second sensing patterns are disposed on the upper layer, and an insulating layer is interposed therebetween.

When each sensing pattern is formed on a different layer, a transparent conductive material (for example, ITO) is used as the sensing patterns have large surface resistance. Accordingly, in order to reduce the surface resistance, a wide connection part connects the sensing patterns disposed on the same layer. However, an overlapping area of each connection part disposed on the upper and lower layers becomes large and the capacity for parasitic capacitance accordingly becomes large, such that the sensitivity sensed by each sensing pattern deteriorates.

In order to overcome these disadvantages, in the related art the first and second sensing patterns can be formed on the same layer and can then be connected by forming separate connection patterns through contact holes formed through the insulating layer on the upper portions of the first or second sensing patterns. In these situations, the connection patterns are made of metal materials having low resistance.

As one example, the connection part of the first sensing patterns is made of the transparent conductive materials like the example disclosed above and the connection part of the second sensing patterns is made of low resistance metal materials and intersects with the connection part of the first sensing patterns.

In other words, the first sensing patterns and the second sensing patterns intersect with each other in the regions where the connection patterns are formed and the widths of the connection patterns are minimized, thereby making it possible to reduce the effect of the parasitic capacitance generated at the intersecting region.

However, even in this case, the connection part connecting the first sensing patterns is still made of the transparent conductive material having a high resistance value and reduces the overlapping area of the intersecting region. Also, since the connection pattern is disposed on the upper portion of the insulating layer, it is vulnerable to static electricity applied or occurring from the outside.

SUMMARY OF THE INVENTION

An embodiment of the present invention provides a flat panel display integrated with a touch screen panel having reduced electrostatic vulnerability of connecting patterns by making the connecting patterns, which connect adjacent first sensing cells and adjacent second sensing cells in first sensing cell and second sensing cells formed on the same level of the lower surface of the upper substrate of the flat panel display, of the same material as metal patterns formed around the edge of the touch screen panel, and by arranging the connecting patterns not to cross each other.

Further, another embodiment of the present invention provides a flat panel display panel integrated with a touch screen having improved visibility by forming the touch screen panel on the upper substrate of the flat panel display such that connecting patterns are formed in the regions between the pixels to prevent the connecting patterns formed on the touch screen panel from overlapping pixels arranged in stripes in the display region of the flat panel display.

An aspect of the present invention provides a flat panel display integrated with a touch screen panel that includes: an upper substrate and a lower substrate each divided into a display region and non-display region formed around the display region; a plurality of sensing patterns formed in the display region of the upper substrate; and a plurality of pixels formed in the display region of the lower substrate, in which the sensing patterns include: a plurality of first connecting patterns arranged in a first direction; a plurality of second connecting patterns arranged in a second direction at a predetermined distance from the first connecting patterns; a plurality of first sensing cells electrically contacting and connected with the first connecting patterns and arranged in the first direction; and a plurality of second sensing cells electrically contacting and connected with the second connecting patterns and arranged in the second direction, and the first connecting patterns and the second connecting patterns are arranged to overlap the regions between the pixels.

In this configuration, the first and second connecting patterns are made of opaque metal.

Further, the flat panel display integrated with a touch screen panel includes a plurality of metal pads disposed at the edge of the display region where the first and second sensing cells are formed, and electrically connecting the sensing cells in one column or row to sensing lines, and the first and second connecting patterns and the metal pads are formed on the same layer and made of metal having lower resistance than the material of the first and second sensing cells.

Further, the second sensing cells are disposed alternately with the first sensing cells not to overlap the first sensing cells.

Further, the upper substrate is an encapsulation substrate made of a transparent material where a plurality of pixels including an organic light emitting element, a thin film transistor, and a storage cover is formed, and a plurality of sensing patterns is formed on the lower surface of the upper substrate which faces the lower substrate.

Alternatively, the upper substrate is a color filter substrate including color filters and a black matrix and where a plurality of pixels including a thin film transistor, a pixel electrode, and a storage cover is formed.

In this configuration, color filters and a black matrix disposed between the color filters are formed on the lower surface of the upper substrate which faces the lower substrate, a plurality of sensing patterns are formed on the upper surface of the upper substrate, the color filters are arranged to overlap the pixels arranged in the display region of the lower substrate, and the first and second connecting patterns included in the sensing patterns are arranged to overlap the black matrix region between the color filters.

According to aspects of the present invention, it is possible to reduce the electrostatic vulnerability of connecting patterns and overcome the ESD (Electrostatic Discharge) problem by making the connecting patterns, which connect adjacent first sensing cells and adjacent second sensing cells, of the same low-resistance metal as metal patterns formed around the touch screen panel, and by arranging the connecting patterns not to cross each other.

It is possible to prevent light radiated from specific pixels from being blocked and improve visibility by forming the touch screen panel on the upper substrate of the flat panel display such that connecting patterns formed in the touch screen panel regions do not overlap the pixels arranged in stripes in a display region of the display panel.

Further, the visibility is improved by forming the sensing cells and the connecting patterns of the touch screen panel on the lower surface of the upper substrate of the flat panel display to minimize the distance from the pixels formed on the lower substrate of the flat panel display.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 2 is a plan view showing a lower substrate of a flat panel display corresponding to

FIG. 1;

DETAILED DESCRIPTION OF THE EMBODIMENTS

Figure 1:
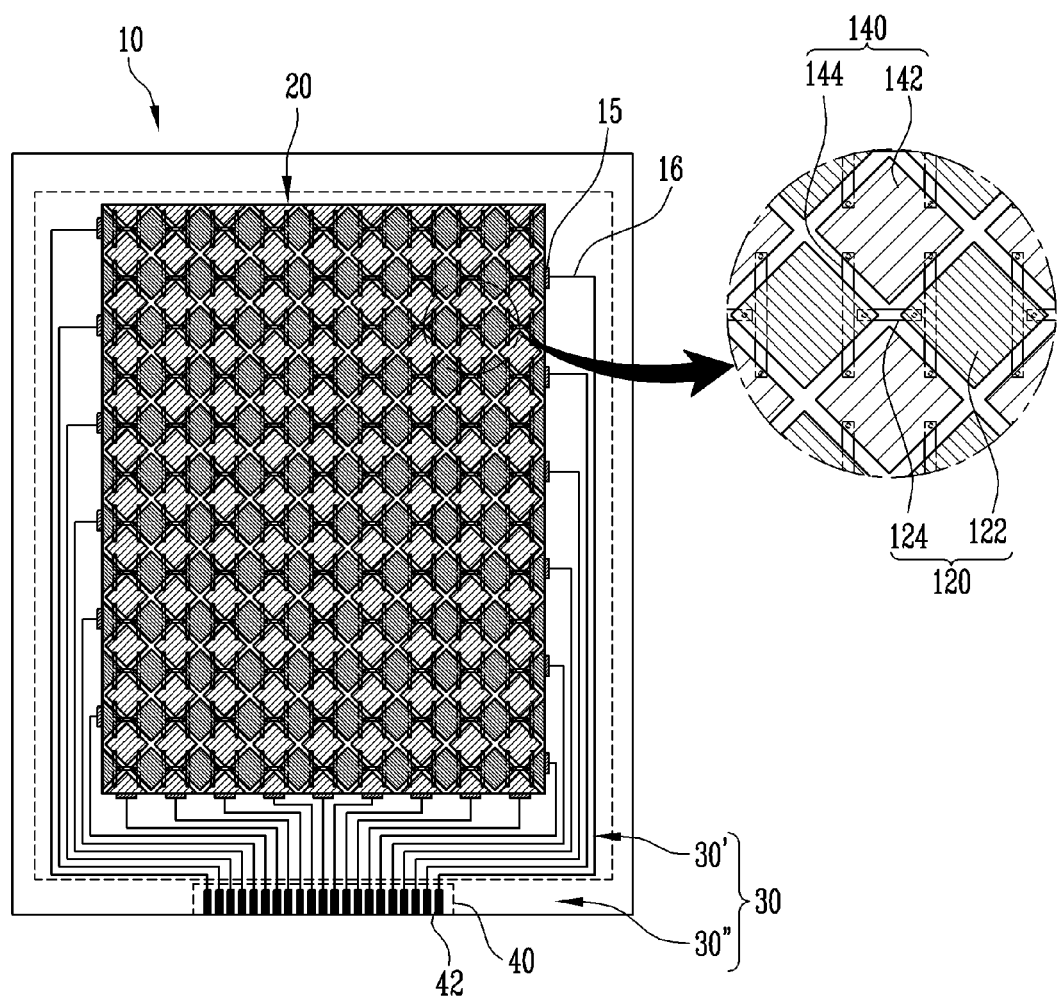
FIG. 1 is a plan view showing an upper substrate of a flat panel display according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures. In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the other element or be indirectly on the another element with one or more intervening elements interposed therebetween. Also, when an element is referred to as being "connected to" another element, it can be directly connected to the another element or be indirectly connected to the another element with one or more intervening elements interposed therebetween.

Figure 2:
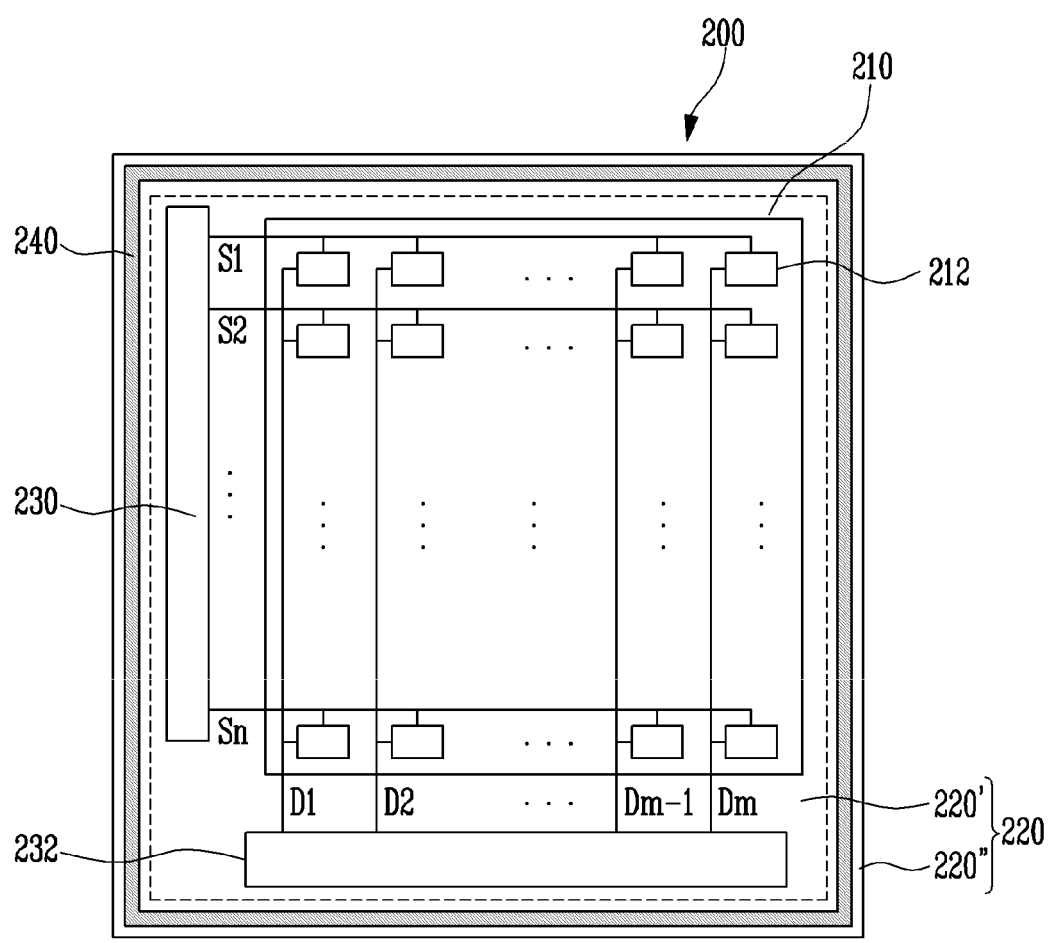

FIG. 1 is a plan view showing an upper substrate of a flat panel display according to an embodiment of the present invention and FIG. 2 is a plan view showing a lower substrate of a flat panel display corresponding to FIG. 1. Referring to FIG. 1 first, a touch screen panel according to an embodiment of the present invention is characterized by being directly formed on the lower surface of an upper substrate 10 of a flat panel display.

The flat panel display herein may be an electroluminescence display or a liquid crystal display. That is, when the flat panel display is an organic electroluminescence display, the upper substrate 10 is an encapsulation substrate made of a transparent material, whereas when the flat panel display is a liquid crystal display, the upper substrate 10 is a color substrate with color filters and a black matrix.

A touch screen panel according to this embodiment of the present invention includes a plurality of sensing patterns 120 and 124 formed on a surface of the upper substrate 10, metal pads 15 and sensing lines 16 electrically connected with the sensing patterns. In this configuration, the region where the sensing patterns 120 and 140 are formed is a display region 20 that displays an image and detects a touch position and the region where the metal pads 15 and the sensing lines 16 electrically connected with the sensing patterns 120 and 140 are formed is a non-display region 30 that is disposed around the display region 20.

Further, in this embodiment of the present invention, the non-display region 30 is divided into a first non-display region 30' where the metal pads 15 and the sensing lines 16 are formed and a second display region 30" disposed around the first non-display region 30' and having an FPC bonding pad portion 40 composed of a plurality of bonding pads 42 connected with the sensing lines 16. In this configuration, the second non-display region 30" is a region where a sealant (not shown) formed between the upper substrate and the lower substrate of the electroluminescence display is applied in order to bond the upper substrate and the lower substrate, in which the upper substrate and the lower substrate are bonded by irradiating the second non-display region 30" with a laser to harden the sealant.

The sensing patterns according to this embodiment of the present invention include first and second sensing patterns 120 and 140 that are alternately disposed and connected in one column having the same X-coordinate or one row having the same Y-coordinate. That is, the first sensing patterns 120 are composed of first sensing cells 122 arranged in a first direction (column direction) in one column having the same X-coordinate and first connecting patterns 124 connecting the adjacent first sensing cells 122, and the second sensing patterns 140 are composed of second sensing cells 142 arranged in a second direction (row direction) in one row having the same Y-coordinate and second connecting patterns 144 connecting the adjacent second sensing cells 142.

In this embodiment of the present invention, since the first sensing cells 122 and the second sensing cells 142 should be formed on the same level and the first and second sensing cells 122 and 144 should be made of a transparent material to implement the operation of the touch screen panel, it is preferable that the first and second sensing cells 122 and 142 are made of a transparent conductive material, that is, indium-tin oxide (hereafter, ITO), for example.

Further, in order that the first sensing cells 122 and the second sensing cells 142 function as sensing electrodes, the sensing cells arranged in the first direction and the second direction should be electrically connected. Accordingly, the first sensing cells 122 are electrically connected through the first connecting patterns 124 and the second sensing cells 142 are electrically connected through the second connecting patterns 144.

In this configuration, since the first sensing cells 122 and the second sensing cells 142 are formed on the same level, the first connecting patterns 124 and the second connecting patterns 144 should not formed on the same level as the first and second sensing cells 122 and 124 to avoid a short-circuit. Accordingly, although the first and second connecting patterns 124 and 144 are formed on a level under the first and second sensing cells 122 and 142 in this embodiment of the present invention, the arrangement is not limited thereto and the first and second connecting patterns 124 and 144 may be formed on a level above the first and second sensing cells 122 and 142.

Further, since the first and second connecting patterns 124 and 144 are formed on the same level, they are formed at a predetermined distance from each other to avoid a short-circuit between them. That is, as shown in FIG. 1, the first connecting patterns 124 are arranged in the first direction (column direction) to electrically connect the first sensing cells 122 and the second connecting patterns 144 are arranged in the second direction (row direction) apart from the first connecting patterns 124 to electrically connect the adjacent second sensing cells 142.

However, although the second connecting patterns 144 connect the adjacent second sensing cells 142 herein in a pair, the arrangement is not limited thereto and they may be implemented by one connection. Further, although the first and second connecting patterns 142 and 144 are formed in a rectangular bar shape, as shown in the figure, this is one embodiment and the shape is not limited thereto.

Further, in this embodiment of the present invention, the first and second connecting patterns 124 and 144 are made of low-resistance metal, and particularly, they are characterized by being made of the same material as the metal pads 15 formed at the end of the display region, where the first and second sensing cells 122 and 142 are formed, and transmitting signals detected by the sensing cells to a driving circuit (not shown). In this case, since the first and second connecting patterns 124 and 144 are formed on the same level as the metal pads 15, an additional mask process for forming the first and second connecting patterns is not needed, such that it is possible to reduce the number of processes and time. Further, since the connecting patterns 124 and 144 connecting the sensing cells are not made of a transparent conductive material the same as the sensing cells, but low-resistance metal, charges can smoothly flow at the junctions of the sensing cells, such that the sensitivity of the sensing cells can be improved.

Further, it is possible to remove any ESD (Electrostatic discharge) problem, that is, remove the electrostatic vulnerability of the connecting cells, by arranging the connecting patterns such that they do not cross each other to. Furthermore, the second sensing cells 142 connected by the second connecting patterns 144 partially overlap the first sensing cells 122, such that it is possible to keep charges passing through the second connecting patterns 144 from concentrating in a narrow space.

Further, the metal pads 15 are disposed at the edge of the display region, where the X- and Y-sensing patterns 120 and 140 are formed, that is, the end of the first non-display region 30', and connect the X- and Y-sensing patterns 120 and 140 with the sensing lines formed on the first non-display region 30'. In detail, the metal pads 15 electrically connect the X- and Y-sensing patterns 120 and 140 in one column or one row with the sensing lines 16, respectively, such that detected contact signals are supplied to the driving circuit (not shown) driving the touch screen panel. For example, the metal pads 15 electrically connect the first sensing patterns 120 in one column with the sensing lines 16 and can electrically connect the second sensing patterns 140 in a row with the sensing lines 16, and the sensing lines 16 are connected with the X- and Y-sensing patterns 12 and 14 through the metal pads 15 and connect them to the driving circuit (not shown).

Further, it is preferable that the metal pads 15 and the sensing lines 16 are made of a low-resistance opaque metal. That is, the touch screen 10 is connected with an FPC (not shown) equipped with an external driving circuit (not shown) through the FPC bonding pad portion 40 and the sensing lines 16 connect the FPC bonding pad portion 40 with the sensing patterns 120 and 140.

The touch screen panel is an electrostatic capacitive touch screen panel, in which when a contact object, such as a human's hand or a touch stick, contacts the touch screen panel, a change in electrostatic capacity in accordance with the contact position is transmitted from the sensing patterns 120 and 140 to the driving circuit through the metal pads 15 and the sensing lines 16. Further, the change in electrostatic capacity is converted into an electric signal by an X- and Y-input process circuit (not shown), such that the position of the contact on the touch screen panel can be located.

Referring to FIG. 2, a lower substrate 200 corresponding to the upper substrate 10 includes a display region 210 where a plurality of pixels 212 for displaying an image is formed and a non-display region 220 formed around the display region 210. It should be understood that, as described above, the flat panel display herein may be an organic electroluminescence display or a liquid crystal display.

In this configuration, when the flat panel display is an electroluminescence display, the pixels 212 on the lower substrate 200 each include an organic light emitting element, a plurality of thin film transistors, and a storage capacitor, whereas when the flat panel display is a liquid crystal display, the pixels 212 on the lower substrate 200 include a thin film transistor, a pixel electrode, and a storage capacitor. Further, the display region 210 is a region displaying a predetermined image, using light emitted from the organic light emitting element or a backlight, which includes a plurality of scanning lines S1 to Sn arranged in the row direction and a plurality of data lines D1 to Dm arranged in the column direction, and where the pixels 212 receiving predetermined signals from a scanning driving circuit 230 and a data driving circuit 232 through the scanning lines S1 to Sn and the data lines D1 to Dm are formed.

Further, the non-display region 220 is divided into a first non-display region 220' where driving circuits, that is, the data driving circuit 232 and the scanning driving circuit 230 are formed to drive the pixels 212 on display region 210 and a second non-display region 220" that is disposed around the first non-display region 220' and where a sealant 240 is formed to bonding the lower substrate 200 with the upper substrate 10. In this configuration, the display region 210 and the first and second non-display regions 220' and 220" of the lower substrate 200 correspond to the display region 20 and the first and second non-display regions 30' and 30" of the upper substrate 10 shown in FIG. 1 so that the corresponding regions overlap each other.

That is, the display region 20 of the upper substrate 10 where the sensing patterns 120 and 140 are formed overlaps the display region 210 of the lower substrate 200 where the pixels 212, the scanning lines S1 to Sn, and the data lines D1 to Dm are arranged, and accordingly, an image formed by light traveling through the display region 210 of the lower substrate 200 is visible to a human's eyes through the display region 20 of the upper substrate 10. However, in a flat panel display integrated with the touch screen panel having the above configuration, as described with reference to FIG. 1, the connecting patterns 124 and 144 connecting the sensing cells 122 and 142 in the display region 20 of the upper substrate 10 are made of opaque metal, in which the pixels 212 in the display region 210 of the lower substrate which are formed in the region overlapped by the connecting patterns 124 and 144 may be covered by the connecting patterns.

In particular, as the resolution of flat panel displays gradually increases and the area of the pixels decreases, the connecting patterns may further cover the pixels, which causes bad sight and deterioration of visibility. In order to overcome these problems, in this embodiment of the present invention, the touch screen panel is formed on the flat panel display such that the connecting patterns 124 and 144 formed on the display region 20 of the upper substrate 10 are arranged in corresponding regions between the pixels 212 without overlapping the pixels 212 arranged in stripes in the display region 210 of the lower substrate 200, thereby providing a touch screen panel with improved visibility. The visibility is further improved by forming the sensing cells 122 and 142 and the connecting patterns 124 and 144 of the touch screen panel on the lower surface of the upper substrate 10 of the flat panel display to minimize the distance from the pixels 212 formed on the lower substrate 200 of the flat panel display.

Figure 3:
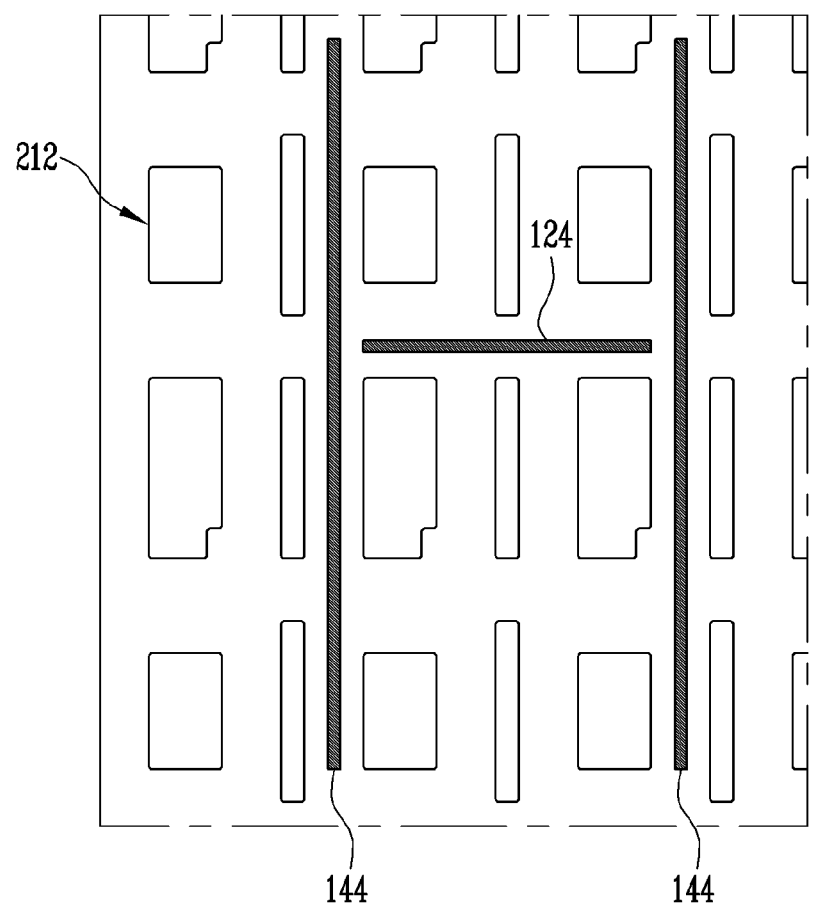
FIG. 3 is a plan view showing arrangement of first and second connecting patterns shown in FIG. 1 and pixels formed in a display region on the lower substrate.

FIG. 3 is a plan view showing arrangement of the first and second connecting patterns 124 and 144 shown in FIG. 1 and pixels 212 formed in a display region on the lower substrate 200. It should be understood that the embodiment shown in FIG. 3 exemplifies the case where a flat panel display is an organic electroluminescence display. That is, the upper substrate 10 of the flat panel display is an encapsulation substrate made of a transparent material and the pixels 212 formed on the lower substrate 200 of the flat panel display each include an organic light emitting element, a plurality of thin film transistors, and a storage capacitor.

Referring to FIGS. 1 and 3, this embodiment of the present invention is characterized in that the first sensing patterns 120 are composed of first sensing cells 122 arranged in one column having the same X-coordinate in the first direction (column direction) and first connecting patterns 124 connecting the adjacent first sensing cells 122, the second sensing patterns 140 are composed of second sensing cells 142 arranged in one row having the Y-coordinate in the second direction (row direction) and second connecting patterns 144 connecting adjacent sensing cells 142, the first and second connecting patterns 124 and 144, as shown in FIG. 3, are arranged between the pixels 212, that is, in the non-light emitting regions, without overlapping the pixels arranged in stripes on the display region 210 of the lower substrate 200. In this configuration, the first connecting pattern 124 and the second connecting pattern 144 may be implemented by at least one or more patterns or, in the embodiment shown in FIG. 1, the second connecting pattern 144 is implemented by a pair of patterns.

Since the connecting patterns 124 and 144 made of metal produce colors, they block light radiated from specific pixels 212 in the display region 210 of the lower substrate 200 which overlap the connecting patterns, such that a human recognizes them as dark points. Therefore, in this embodiment of the present invention, in order to overcome this problem, it is possible to remove the dark points described above by arranging the connecting patterns 124 and 144 such that they do not overlap the pixels 212. Further, the case shown in FIG. 3 is characterized in that the sensing patterns 120 and 140 composed of the sensing cells 122 and 142 and the connecting patterns 124 and 144 in the touch screen panel are formed on the lower surface of the upper substrate 10 disposed opposite to the lower substrate 200 of the flat panel display to minimize the distance from the pixels 212 on the lower substrate 200, thereby improving the visibility even more.

Figure 4:
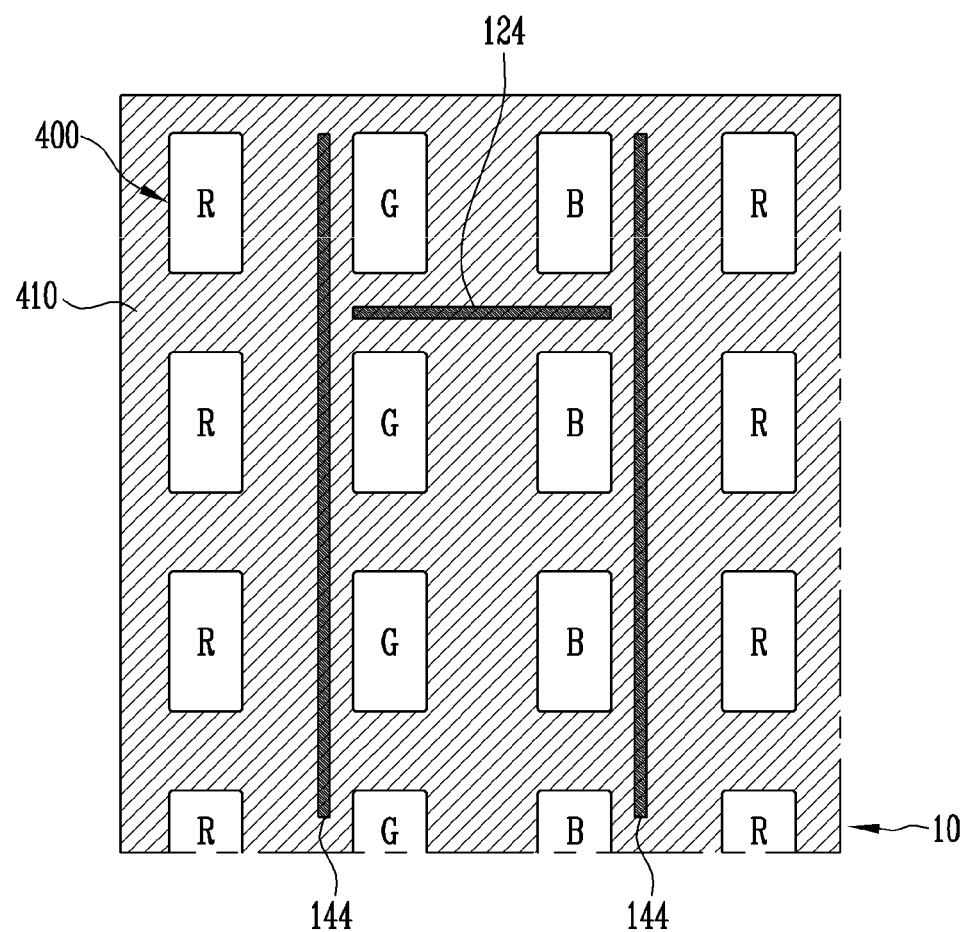
FIG. 4 is a plan view showing arrangement of first and second connecting patterns shown in FIG. 1 and color filters and a black matrix formed on a side of the upper substrate.

FIG. 4 is a plan view showing the arrangement of first and second connecting patterns 124 and 144 shown in FIG. 1 and color filters 400 and a black matrix 410 are formed on a side of the upper substrate. It should be understood that the embodiment shown in FIG. 4 exemplifies where a flat panel display is a liquid crystal display.

That is, the upper substrate 10 of the flat panel display is a color filter substrate where color filters and a black matrix 410 are formed and the pixels 212 formed on the lower substrate 200 of the flat panel display, each having a thin film transistor, a pixel electrode, and a storage capacitor. Referring to FIGS. 1 and 4, in this embodiment of the present invention, the first sensing patterns 120 are composed of first sensing cells 122 arranged in a first direction (column direction) in one column having the same X-coordinate and first connecting patterns 124 connecting the adjacent first sensing cells122, and the second sensing patterns 140 are composed of second sensing cells 142 arranged in a second direction (row direction) in one row having the same Y-coordinate and second connecting patterns 144 connecting the adjacent second sensing cells 142.

In this configuration, the first sensing patterns 120 and the second sensing patterns 140 are formed on the upper surface of the upper substrate 10. Further, red R, green G, and blue B color filters 400 are formed on the lower surface of the upper substrate 10, as shown in FIG. 4, a black matrix 410 is formed between the color filters 400, and the color filters 400 overlap the pixels 212 arranged in stripes in the display region 210 of the lower substrate 200 of the liquid crystal display.

The embodiment shown in FIG. 4 is characterized in that the first and second connecting patterns 142 and 144 on the upper substrate 10 are arranged in regions between the color filters 400 on the lower surface of the upper substrate 10, that is, arranged to overlap the black matrix 410. In this configuration, the first connecting pattern 124 and the second connecting pattern 144 may be implemented by at least one or more patterns or, in the embodiment shown in FIG. 1, the second connecting pattern 144 is implemented by a pair of patterns.

Since the connecting patterns 124 and 144 made of metal show colors, they block light radiated from specific pixels 212 in the display region 210 of the lower substrate 200 which overlap the connecting patterns, such that a human recognizes them as dark points. Therefore, in this embodiment of the present invention, in order to overcome this problem, it is possible to remove the dark points described above by arranging the connecting patterns 124 and 144 to correspond to the region of the black matrix 410 between the color filters 400 without overlapping the color filters 400 corresponding to the pixels 212.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A flat panel display integrated with a touch screen panel, comprising:
   an upper substrate and a lower substrate each divided into a display region and non-display region formed around the display region;
   a plurality of sensing patterns formed in the display region of the upper substrate; and
   a plurality of pixels formed in the display region of the lower substrate,
   wherein the sensing patterns include:
      a plurality of first connecting patterns arranged in a first direction,
      a plurality of second connecting patterns arranged in a second direction at a predetermined distance from the first connecting patterns,
      a plurality of first sensing cells electrically contacting and connected with the first connecting patterns and arranged in the first direction,
      a plurality of second sensing cells electrically contacting and connected with the second connecting patterns and arranged in the second direction, and
      the first connecting patterns and the second connecting patterns are formed at a same layer and are arranged not to cross each other and to overlap the regions between the pixels.

2. The flat panel display integrated with a touch screen panel as claimed in claim 1, wherein the first and second connecting patterns are made of opaque metal.

3. The flat panel display integrated with a touch screen panel as claimed in claim 1, further comprising a plurality of metal pads disposed at the edges of the display region where the first and second sensing cells are formed, and electrically connecting the sensing cells in one column or row to sensing lines.

4. The flat panel display integrated with a touch screen panel as claimed in claim 3, wherein the first and second connecting patterns and the metal pads are formed on the same layer and made of metal having lower resistance than the material of the first and second sensing cells.

5. The flat panel display integrated with a touch screen panel as claimed in claim 1, wherein the second sensing cells alternate with and adjoin the first sensing cells.

6. The flat panel display integrated with a touch screen panel as claimed in claim 1, wherein:
   the upper substrate is an encapsulation substrate made of a transparent material, and a plurality of pixels including an organic light emitting element, a thin film transistor, and a storage cover is formed.

7. The flat panel display integrated with a touch screen panel as claimed in claim 6, wherein a plurality of sensing patterns is formed on the lower surface of the upper substrate which faces the lower substrate.

8. The flat panel display integrated with a touch screen panel as claimed in claim 1, wherein:
   the upper substrate is a color filter substrate including color filters and a black matrix, and
   a plurality of pixels including a thin film transistor, a pixel electrode, and a storage cover is formed.

9. The flat panel display integrated with a touch screen panel as claimed in claim 8, wherein:
   color filters and a black matrix disposed between the color filters are formed on the lower surface of the upper substrate which faces the lower substrate, and
   a plurality of sensing patterns is formed on the upper surface of the upper substrate.

10. The flat panel display integrated with a touch screen panel as claimed in claim 9, wherein the color filters are arranged to overlap the pixels arranged in the display region of the lower substrate.

11. The flat panel display integrated with a touch screen panel as claimed in claim 9, wherein the first and second connecting patterns included in the sensing patterns are arranged to overlap the black matrix between the color filters.

* * * * *